United States Patent Office 3,073,884
Patented Jan. 15, 1963

3,073,884
HIGH ENERGY BATTERIES
Richard C. Pinkerton, Baton Rouge, La., assignor to Ethyl Corporation, New York, N.Y., a corporation of Delaware
No Drawing. Filed Aug. 3, 1959, Ser. No. 831,082
6 Claims. (Cl. 136—100)

This invention relates to high energy voltaic cells or batteries. In particular, it relates to high energy cathodic oxidants.

Batteries, or voltaic cells, have been widely used for many years. Generally their use is limited because of their low energy output per unit weight. A considerable portion of the weight of such cells is to be found associated with the cathodic reactants. These materials give low energy output particularly in terms of their weight. Such materials are usually the oxides or peroxides of manganese, copper, silver, lead, mercury, vanadium, etc. It is generally necessary to employ a considerable quantity of these oxidizer materials in batteries. Many of these materials are of a porous nature and require large amounts of electrolyte which also adds to the weight.

Generally, also, the electrical conductors employed within conventional batteries are aqueous solutions consisting generally of acids, bases and salts. The use of such cells however is, in general, greatly limited because of their low energy output for a given weight of reactants. This limitation is even more apparent in those cells wherein the reactants must be supplied in dilute solutions.

A very serious limitation on the use of such cells is that the most active metals of the electromotive series cannot be used as electrodes. With the exception of some metals such as lead, cadmium and zinc, metals above hydrogen in the electromotive force series cannot be employed. These exceptions occur only because of the beneficial effects, in these instances, of the hydrogen over-voltage. Normally however, the more active metals react with water to liberate hydrogen and do not release electrons to the external circuit.

Another factor which greatly limits the use of such cells is that the current supplied is clearly reduced in value during even a short period of use because of the accumulation of hydrogen on the positive plate of the cell. This action, termed polarization, not only introduces a high resistance into the circuit, but alters the metal of the electrode and sets up an opposing electromotive force which must be overcome before the cell can supply current to the external circuit.

A great need therefore exists for the development of higher performance, viz., high energy and high power, electrochemical sources. High energy sources for example would find applications in missiles, satellites, magnetic mines, radio and television. High power sources would find applications in torpedoes, rockets, etc. and can even make broadly feasible the use of batteries for propelling automobiles.

Accordingly, it is an object of the present invention to provide a new class of highly energetic cathodic oxidants. It is also an object to provide batteries having energetic electrochemical reactions and therefore capable of higher performance. Another object of the present invention is to provide a new class of electrolytes which permit the use of the more active metals as electrodes. Also it is an object to provide a new and highly energetic class of electrolyte materials for use in batteries, such electrolyte materials providing many far reaching advantages over those presently used. An additional object is to provide new types of electrode-electrolyte combinations for high performance batteries. Another object is to eliminate active hydrogen from batteries or voltaic cells so that active metals have even greater potential. Yet another object of the invention is to provide cells which are operable over an extremely wide temperature range and will therefore provide for applications at sub-zero conditions and at very elevated temperatures for specialized purposes. An even further object is to provide new types of primary and secondary voltaic cells.

These and other objects are achieved according to the present invention which comprises employing a highly energetic cathodic oxidizing system within a voltaic cell. Such a cell comprises a plurality of electrodes, including an anode and cathode, immersed within an electrolyte confined within a container. The cathodic oxidizing system is composed of an oxidizer and an acceptor. The acceptor and oxidizer react together at the cathode to produce an electric current through an external circuit connected between the anode and cathode.

The acceptor is a compound having the formula:

$$M'R_n$$

wherein $M'$ is a metal selected from the groups consisting of IIB and IIIA metals and metalloids, including boron, and including beryllium and magnesium of group IIA; R is selected from organic radicals and inorganic substituents; and $n$ is an integer equal to the valence of $M'$.

The oxidizer is a compound selected from the group consisting of metal halides, non-metal halides, oxyhalides, organic esters of inorganic acids, halogenated aromatic ethers and organic halides. Included within the metal halides are all the metals and metalloids, or any element exhibiting any metallic character whatever, of groups IV, V, VI, VIIB and VIII. The non-metal halides cover the halides of groups IVA, VA, and VIA. The oxyhalide compounds are formed of those elements, metals and nonmetals, selected from the groups IV, V, VIA and VIB. The organic esters of inorganic acids cover the nitric and sulfuric acid esters of hydrocarbons having up to about 10 carbon atoms. The ethers include the alkoxy substituted halogenated aromatic hydrocarbons. The organic halides include any halo-substituted hydrocarbon whether cyclic or acyclic, aromatic, straight chained or branched chained, saturated or unsaturated.

These acceptor and oxidizer compounds include those wherein the nature of the bond is truly ionic and also those wherein the nature of the bonding is covalent as well as $\pi$ and d-orbital bonding up to the number of substituents which would normally exist if true ionic valences were exihibited within the compounds.

A significant feature of this invention is that a very large quantity of electrical energy is released for a given weight of cathodic reactants.

By using a highly preferred electrolyte an even greater quantum of electrical energy can be obtained from such a cell. Thus, a highly preferred form of this invention comprises the use of an electrolyte consisting of a bimetallic complex:

$$MR_x \cdot yM''R_n$$

wherein M is an alkali or alkaline earth metal or an "onium" cation; R is an inorganic substituent or organic radical; $x$ and $n$ are small integers equal to the valence of M and $M''$ respectively; $y$ is an integer not greater than 2 and $M''$ is a group II through VIII metal.

The exact nature of the electrochemical reaction of the oxidizing system—viz., the acceptor and oxidizer—is not known. Theoretically, however, when the acceptor and the oxidizer are added together, they take an electron or electrons, from the cathode, and whether originally electronegative in character or not, they become more electronegative. Thus, for example, the total cell reaction for an oxidizing system consisting of an ethyl chloride oxidizer and a triethylborane acceptor, in a cell having a sodium anode, can be written:

$$C_2H_5Cl + B(C_2H_5)_3 + 2Na \rightarrow NaCl + NaB(C_2H_5)_4$$

The half cell reactions can be written:

Cathode: $C_2H_5Cl + B(C_2H_5)_3 + 2e \rightarrow B(C_2H_5)_4^- + Cl^-$
Anode: $2Na \rightarrow 2Na^+ + 2e$ In this environment then, ethyl chloride acts in a very unusual capacity, viz., as an oxidizer. The ethyl radical forms a complex with the triethylborane and the chlorine exists independently as an ion.

In some instances both fragments of the oxidizer can form a complex and in other cases only one portion of the oxidizer can complex with the acceptor, as in the above reaction. Thus, if $\phi X$ represents the oxidizer and $M'R_n$ the acceptor, the foregoing cathodic reaction can be written:

$$2e + M'R_n + \phi X \rightarrow M'R_n\phi^- + X^-$$

Where both $\phi$ and X complex with $M'R_n$, the cathodic reaction can be written:

$$2e + 2M'R_n + \phi X \rightarrow M'R_n\phi^- + M'R_nX^-$$

Also, it is not known in each instance over the broad range of operable compounds, nor is it necessary to state wherein each oxidizer will break to form the $\phi$ and X portions. In some instances $\phi$ and X may be single elements after separation into the $\phi$ and X portions, or each may be groups of similar or dissimilar elements.

The following examples illustrate the present invention but are not intended as limiting same. All parts are given by weight unless otherwise specified.

In these examples, the cathode consists of porous graphite upon the surface of which is added the cathodic oxidizing system.

The first seven of the following examples employ oxidizers consisting of metal halides.

In the example immediately following, the metallic portion of the oxidant represents a group IVA metal, and the acceptor, $M'R_n$, is a group IIA metal. The cell is operated at an elevated temperature.

EXAMPLE I

A glass "U-cell" is filled with an electrolyte consisting of a saturated dimethylene glycol dimethyl ether solution of sodium cyanide. Diethylmagnesium and a quantity of stannic fluoride are added to the catholyte. The anode is composed of magnesium metal. The cell is operated at a temperature of 80° C. and at ambient pressure.

The external circuit is closed and an electrochemical reaction occurs at the cathode. A high voltage is registered.

The following example demonstrates the use of an oxidant wherein the metallic portion is a IVB metal. Again M' of the acceptor, $M'R_n$, is a group IIA metal.

EXAMPLE II

In this example the cell is provided with a zinc anode and an electrolyte consisting of potassium iodide dissolved in diethylene glycol dimethyl ether. A quantity of diphenylberyllium and a small quantity of titanium tetrachloride are then added to the cathode compartment. The cell is operated at ambient temperature and pressure. The external circuit is closed and a high voltage is recorded.

The following example employs an oxidant having a metallic member selected from group VA. The acceptor, $M'R_n$, employs a group IIB metal as a part of the compound.

EXAMPLE III

In this example the anode consists of aluminum metal and the electrolyte employed is sodium bromide dissolved in acetonitrile. A diphenylzinc acceptor is charged into the catholyte followed by the addition of a small quantity of arsenic fluoride. The cell is operated at 25° C. and at ambient pressure.

The external circuit is completed and again a high voltage is recorded.

In the example immediately following, an acceptor, $M'R_n$, is employed which again includes a group IIB metal. The temperature of operation is raised even higher than in Example I. The oxidant employed is one wherein the metallic portion is represented by a group VB metal.

EXAMPLE IV

The anode in this illustration is calcium metal. The electrolyte employed in the cell consists of a saturated solution of sodium cyanide in dimethyl ether of tetraethylene glycol. The acceptor consists of dimethylzinc which is charged into the electrolyte in the vicinity of the cathode. A small quantity of vanadium tetrachloride oxidant is added. The temperature of the cell is raised to 100° C. Upon completion of the external circuit, a high voltage is recorded.

The following example illustrates an acceptor wherein the metal is one selected from group IIIB, and in addition now employs an oxidant wherein the metallic portion is a VIB metal.

EXAMPLE V

In this example the electrolyte consists of an equimolar complex of sodium amide and triethylborane dispersed in dimethylene glycol dimethyl ether. A small quantity of molybdenum pentachloride and diethylcadmium is added thereto. A sodium metal anode is employed and the cell is operated at ambient temperature and pressure. Upon completion of the external circuit a high voltage is recorded.

Having demonstrated the use of an oxidizer employing a group VIB metal, the following example employs one wherein the metallic portion of the oxidizer is a VIIB metal. In the example following, the acceptor, $M'R_n$, is one wherein a group IIIA metal forms the compound. Also in the following example, a highly preferred electrolyte, a bimetallic complex, $MR_x \cdot yM''R_n$, is employed as the electrolyte.

EXAMPLE VI

The anode in this example consists of a sodium-potassium alloy. The electrolyte is sodium borohydride dissolved in diethyl ether. Diborane is employed as the acceptor, $M'R_n$, and a small quantity of manganese tetrachloride is added as oxidant.

Upon closing the external circuit a high voltage is recorded.

The following example represents a metal halide oxidant wherein the metallic portion is a group VIII metal.

EXAMPLE VII

The anode in this example consists of a sodium-potassium alloy. The electrolyte consists of an equimolar complex of potassium cyanide and triethylborane dissolved in dimethylene glycol dimethyl ether. A small amount of triethylborane, which constituted the acceptor, and a small quantity of ferric chloride was added to the catholyte. The cell is operated at ambient conditions of temperature and pressure.

Upon closing the external circuit a high voltage, viz., 3.7 is recorded.

In the following examples, Examples VIII through X, the nonmetal halides employed are those wherein the more electropositive element, or elements, of the oxidizers are elements selected from groups IVA, VA, and VIA of the periodic chart of the elements.

In the example immediately following, the more electro-positive portion of the oxidant is represented by a group IVA element.

EXAMPLE VIII

A glass "U-cell" is filled with an electrolyte consisting of a saturated dimethylene glycol dimethyl ether solution of sodium iodide. Diethylmagnesium and a quantity of silicon iodotrichloride are added to the catholyte. Into the electrolyte is extended an anode of magnesium metal. The cell is operated at a temperature of about 30° C. and at ambient pressure.

The external circuit is closed and an electrochemical reaction occurs at the cathode. A high voltage is registered.

The following example demonstrates an oxidant wherein the more electropositive element is represented by a group VA element. The acceptor, $M'R_n$, is a compound having a group IIB metal substituent.

EXAMPLE IX

In this example the anode consists of aluminum metal and the electrolyte employed is sodium iodide in acetonitrile. A zinc diphenyl acceptor is charged into the catholyte followed by the addition of a small quantity of phosphorus trichloride. The cell is operated at 25° C. and at ambient pressure.

The external circuit is completed and again a high voltage is recorded.

The following example represents an oxidizer wherein the more electropositive portion of the compound is a VIA element.

EXAMPLE X

A dilute solution of tetraethylammonium chloride in triethylamine is employed as the electrolyte. A magnesium anode is inserted therein. A small quantity of diphenyl zinc is charged into the cell in the vicinity of the cathode, followed by the addition of a small quantity of sulfur chloride. The cell is operated at 25° C. The external circuit is closed and again a very high voltage is recorded.

Having demonstrated the use of metal halides and non-metallic halides as oxidizers, the following examples demonstrate the use of oxy-halides as oxidizers. Such oxidizers are those wherein the more electropositive elements are metals and non-metals selected from groups IVA, IVB, VA, VB, VIA and VIB of the periodic chart of the elements.

In the example immediately following, the more electropositive element of the oxidizer is represented by a group IVA element.

EXAMPLE XI

In this example the "U-cell" is filled with an electrolyte consisting of a saturated dimethylene glycol dimethyl ether solution of sodium tetraethylboron. An aluminum anode is employed. A small quantity of triethylborane is added to the catholyte as an acceptor. The oxidizer, phosgene gas, is passed into the lower portion of the cathode compartment through a glass tube extended into the cathode compartment from above. The cell is operated at ambient temperature and pressure.

The external circuit is completed and an electrochemical reaction occurs at the cathode. A high voltage is registered.

The following example demonstrates one wherein an oxidizer is employed which has a group IVB metal as a substituent.

EXAMPLE XII

The foregoing example is repeated except that titanium oxychloride is added to the catholyte as an oxidant. Again highly satisfactory results are obtained.

In the following example the more electropositive portion of the oxidant is represented by a group VA element.

EXAMPLE XIII

In this instance, the "U-cell" is filled with an electrolyte consisting of a saturated solution of an equimolar complex of potassium thiocyanate and triethylborane in dimethylene glycol dimethyl ether. The anode consists of sodium metal. A small quantity of the triethylborane acceptor and a phosphorus oxychloride oxidant are added to the catholyte. The cell is operated at ambient temperature and pressure.

Upon closure of the external circuit a voltage in excess of 3 is recorded.

In the following example an oxidant is employed having a metallic portion represented by a VB metal.

EXAMPLE XIV

The foregoing example is repeated in all details except that in this instance vanadium oxychloride is employed as the oxidant. Highly satisfactory results are obtained.

In the following example, the chloride of a VIA element is employed.

EXAMPLE XV

In this example the electrolyte consisted of an equimolar complex of potassium thiocyanate and triethylaluminum in dimethylene glycol dimethyl ether. The anode employed was sodium metal. The cell was operated at ambient conditions of temperature and pressure. A small quantity of triethylaluminum and thionyl chloride were added into the cathode compartment. Some chemical action occurred but after closure of the external circuit, an electrochemical reaction was produced.

When the external circuit was closed, a voltage of 3.0 was recorded.

In the example immediately following, the oxidizer contains a VIB metal.

EXAMPLE XVI

The foregoing example is repeated in all details except that in this instance chromium oxychloride is employed as the oxidant. Again, highly satisfactory results are obtained.

Having demonstrated in Examples XI through XVI the use of oxy-halide oxidizers, the following examples demonstrate electrochemical reactions wherein organic esters of inorganic acids are employed.

In the example immediately following, a dialkyl sulfate is employed as an oxidizer.

EXAMPLE XVII

An electrolyte, containing an equimolar complex of sodium amide and triethylborane in dimethyl ether of tetraethylene glycol is charged into the cell. A sodium anode is employed and the cell is operated at ambient conditions of temperature and pressure. A small quantity of a triethylborane acceptor and a diethyl sulfate oxidizer is charged into the catholyte.

Upon closure of the external circuit, a voltage of 3.1 was recorded.

In the following example a nitric acid ester is employed.

EXAMPLE XVIII

The foregoing example is repeated in all details except that in this instance ethyl nitrate is employed as the oxidizer. Again highly satisfactory results are obtained.

Having demonstrated the use of organic esters of inorganic acids as oxidizers in the two foregoing examples, the following example represents the use of a halo-substituted aromatic ether as an oxidizer.

EXAMPLE XIX

A glass "U-cell" was filled with an electrolyte consisting of a saturated dimethylene glycol dimethyl ether solution of an equimolar complex of potassium cyanide and triethylborane. A sodium anode was employed. The cell was operated at ambient conditions of temperature and pressure. A small quantity of a triethylborane acceptor and p-bromoanisole was charged into the cathode compartment.

Upon closure of the external circuit, a voltage of 3.1 was recorded.

The following examples represent runs wherein organic halides were employed as oxidizers.

EXAMPLE XX

A "U-cell" is filled with an electrolyte consisting of a saturated dimethylene glycol diethyl ether solution of sodium iodide. Diethylmagnesium and a quantity of carbon tetrachloride are added to the cathode side and the cell operated at ambient conditions of temperature and pressure. A magnesium metal anode is employed.

The external circuit is closed and an electrochemical reaction occurs at the cathode. A high voltage is registered.

EXAMPLE XXI

The foregoing example is repeated in all details except that in this instance chloroform, ethyl chloride, isopropyl chloride, hexachloroethane, 1,2-dichloroethylene, vinyl chloride and vinylidene chloride respectively, are employed as oxidants. Highly satisfactory results are obtained in each instance.

In the following example, a substituted organic halide is employed.

EXAMPLE XXII

An electrolyte, sodium triethylboron amide, containing an excess of triethylboron is charged into the cell. A small quantity of ethylene bromohydrin is then added to the cathode compartment. Again a magnesium metal anode is employed, and the cell is operated at ambient temperature and pressure. Upon completing the external circuit, a high voltage is recorded.

EXAMPLE XXIII

The foregoing example is repeated in all details except that in this instance chlorobenzene, benzyl chloride, p-chlorophenol, chloronitroaniline, benzoyl chloride, 1-chloro-1,3-cyclopentadiene, 1-chloro cyclohexene, and chloronaphthalene are employed as oxidants. Again, as in the foregoing, highly satisfactory results are obtained.

The following table lists a large number of oxidizer systems—viz., oxidants and acceptors—and a highly preferred class of bimetallic compounds dissolved in dimethylene glycol dimethyl ether to form electrolytes. The runs were made in the presence of an anode consisting of active metals selected from group IA. The tabulation includes only those demonstrations wherein the voltages recorded were 3 or greater. The importance of this discovery is quite apparent.

chloride; magnesium chlorohydride and diborane; lithium cyanide and aluminum hydride; and lithium cyanide and selenium chlorohydride, respectively. Satisfactory voltages are registered.

From the foregoing examples, it will be seen that a fairly wide variety of compounds can be employed to constitute this unique cathodic oxidizing system.

As has been shown, the oxidizer can be a metal halide, a non-metal halide, an oxy-halide, an organic ester of an inorganic acid, a halogenated ether or an organic halide. The metal halides useful in the practice of this invention include all the metals, and metalloids, of group IVA, listed in order of preference, tin, lead and germanium; halides of group IVB metals, zirconium, hafnium, and especially titanium which is preferred; halides of VA metals and metalloids, arsenic, antimony and bismuth; halides of VB metals, niobium, tantalum and especially vanadium which is highly preferred; halides of all VIB metals, molybdenum, tungsten and especially chromium; halides of VIIB metals, technetium, rhenium, and especially manganese which is preferred; halides of all group VIII metals, platinum, iridium, osmium, palladium, rhodium, ruthenium, nickel, cobalt and iron. Iron and cobalt are highly preferred. Compounds of all such metals possessing the higher valence state are preferred. Examples of the foregoing class of compounds include stannic fluoride, stannic iodide, lead tetrachloride, germanium tetrachloride, arsenic fluoride, antimony pentachloride, bismuth fluoride, titanium tetrachloride, zirconium bromide, hafnium chloride, vanadium tribromide, neodymium chloride, tantalum fluoride, chromous chloride, tungsten pentachloride, manganese chloride, rhenium fluoride, osmium trichloride, osmium tetrachloride, ferrous chloride, ferric chloride, nickel bromide, cobaltic chloride, palladous bromide, platinic bromide, rhenium chloride, iridium tetraiodide, etc. In addition to the metal halides, the non-metal halides of groups IVA, VA and VIA are also very useful in the practice of this invention. Such compounds include from groups IVA and VA, for example, silicon tetrachloride, silicon tetrafluoride, silicon tetrabromide, silicon tetraiodide, nitrogen triiodide, nitrogen trichloride, phosphorus trichloride, phosphorus pentachloride, phosphorus tribromide, phosphorus heptabromodichloride, phosphorus bromonitride, phosphorus monobromotetrachloride, phosphorus iodochloride, etc. The non-metal halides of VIA elements include such compounds as sulfur monobromide, sulfur tetrachloride, sulfur chloroiodide, sulfur hexafluoride, sulfur monooxydichloride, sulfur pentaoxytetrachloride, Table

| Example | Oxidant | Acceptor | Bimetallic Complex | Anode | Voltage |
|---|---|---|---|---|---|
| XXIV | Carbon tetrachloride | Triethylaluminum | Potassium triethylaluminum cyanide | Sodium | ±3.0 |
| XXV | Silicon tetrachloride | Triethylborane | Potassium triethylboron cyanate | do | 3.5 |
| XXVI | Phosphorus oxychloride | do | Potassium triethylboron thiocyanate | do | 3.4 |
| XXVII | Phosphorus pentachloride | do | Potassium triethylboron cyanide | do | 3.3 |
| XXVIII | Arsenic trichloride | do | Potassium triethylboron cyanate | do | 3.0 |
| XXIX | Sulfuryl chloride | do | Potassium triethylboron thiocyanate | do | 3.5 |
| XXX | do | do | Sodium triethylboron amide | do | 3.4 |
| XXXI | do | do | Sodium tetraethylboron | do | 3.5 |
| XXXII | Sulfur chloride | do | Potassium triethylboron cyanate | do | 3.4 |
| XXXIII | Sulfuryl chloride | Triethylaluminum | Potassium triethylaluminum thiocyanate | do | 3.0 |
| XXXIV | Sulfonyl chloride | Triethylborane | Potassium triethylboron nitrosyl | do | 3.3 |
| XXXV | do | do | Potassium triethylboron thiocyanate | do | 3.8 |
| XXXVI | Diethylsulfate | do | Potassium triethylboron cyanide | do | 3.1 |
| XXXVII | do | do | do | Potassium | 3.1 |
| XXXVIII | Ferric chloride | do | do | Sodium | 3.7 |
| XXXIX | Sulfonyl chloride | do | do | Potassium | 4.0 |

The following example is intended to illustrate runs wherein hydrides and mixed hydrides are employed as electrolytes.

EXAMPLE XL

Examples XXIV through XXXIX are repeated except that in these instances the electrolyte employed in each of those runs is replaced by a complex of lithium cyanide and magnesium hydride; sodium hydride and zinc selenium monobromide, selenium tetrabromide, selenium tribromochloride, selenium bromotrichloride, selenium tetrafluoride, selenium tetraiodide, etc. Oxy-halides can also be employed as oxidizers and such compounds include the oxy-halides of metals and non-metals selected from groups IVA, IVB, VA, VB, VIA and VIB. Illustrative of such compounds are phosgene, silicon oxychloride, silicon oxybromide, etc.; IVB metal oxy-halides such as titanium oxybromide, zirconium oxychloride, hafnium oxychloride, etc.; oxy-halides of the elements of VA include nitrosotribromide, nitroxylchloride, nitroxylfluoride, nitrosil chloride, phosphorus oxybromide, phosphorus oxybromodichloride, phosphorus oxychloride, phosphorus oxyfluoride, phosphorus oxyiodide, arsenous oxychloride, antimonous oxychloride, antimonic oxychloride, bismuth oxybromide, bismuth oxychloride, bismuth oxyfluoride, bismuth oxyiodide, etc.; oxy-halides of the VB metals include vanadium monooxychloride, vanadyl oxytribromide, vanadyl tribromide, vanadyl trichloride, niobium oxybromide, niobium oxytrichloride, tantalum oxybromide, etc.; elements of VIA oxyhalides include sulfurous oxybromide, sulfurous oxychloride, sulfurous oxyfluoride, sulfur oxytetrachloride, sulfur trioxytetrachloride, selenium oxybromide, selenium oxychloride, selenium oxyfluoride, etc.; VIB metal oxy-halides include chromyl chloride, molybdenum oxychloride, molybdenum oxyfluoride, tungsten oxydibromide, tungsten oxytetrachloride, tungsten oxytetrafluoride, etc. The oxidizers also include organic esters of inorganic acids. Illustrative of such compounds are diphenyl sulfate, ethyl nitrite, ethyl nitrate, ethyl phosphate, ethyl phosphoric acid, etc.; such oxidizers can also be salts of the organic esters of poly basic inorganic acids such as dodecyl sodium sulfate, 2-dodecanol sodium sulfate, etc.; included also are halogenated ethers such as alpha-chloroanisole, beta-bromophenetole, 2-bromo-4-chloroanisole, p-alpha-chlorobenzylanisole, 1-methoxy anthracene chloride, even those which are heterocyclic compounds such as methoxy quinoline chloride, etc. Included also are the organic halides. These compounds include, for example, tertiary butylchloride, heptyl chloride, 1,4-dibromoxylene, alpha-chlorohemimellitene, m-bromopheno, 1,5-dichloronaphthalene, 5-bromo-2-tyridol, 1-bromo-1,3-cyclopentadiene, 1-chloro-cyclohexene, etc.

The number of carbon atoms contained within the hydrocarbon radical of the oxidizer having such substituents is inconsequential other than that the greater number of carbon atoms increases the weight of the reactant and from which usually there is not derived enough corresponding benefit, with regard to energy release. Therefore, it is not generally desirable to employ compounds wherein the number of carbon atoms contained within the hydrocarbon radical is in excess of 30. Compounds having not more than 10 carbons in the hydrocarbon radicals are preferred. Other substituents, nitrogen, sulfur, etc., can be present within the ring so as to form heterocyclic compounds. Generally however, not more than about three such substituents should be present. Other elements can also be present provided they be substantially inert. Substituents can also be present in substituted portions, up to about 3 in number, and can even be greater in number provided that they be substantially inert in the reaction.

The acceptor, $M'R_n$, comprises metals and metalloids from groups IIB and IIIA, including boron, and beryllium and magnesium of group IIA of the periodic chart of the elements. This includes within IIB and IIIA all elements possessing any metallic character whatever—viz., zinc, cadmium, mercury, boron, aluminum, gallium, indium, tantalum, etc. Especially preferred are the metals and metalloids of group III, especially boron which falls within group IIIA. Organoaluminum compounds are also highly preferred. It is also preferred that the metal, or metalloid, be bonded or attached directly to one or more carbon atoms. However, it is to be understood that the metal need not be bonded to carbon but can be entirely bonded to inorganic substituents, viz., halogen, e.g., chlorine, bromine, iodine, and fluorine; pseudo halides, viz., cyanide, thiocyanide, isocyanide, etc.; hydrogen, or an inorganic anion such as sulfate, sulfite, nitrite, nitrate, etc.; or a mixture, for example of hydrogen and halogen, or a mixture of any of the foregoing.

The organic portion can be any organic radical including those having substituents in the radical, such as a halogen, provided such are essentially inert. The organic radicals of the organometallic compounds are hydrocarbon radicals, either acyclic or cyclic, saturated or unsaturated, aliphatic, whether straight chain or branched chain, or aromatic radicals. Of the aliphatic radicals, it is preferred to employ the lower alkyl radicals having up to about 10 carbon atoms. Among the aromatic radicals which can be employed are included phenyl and hydrocarbon substituted phenyl radicals such as alkaryl radicals, and fused-ring aromatic radicals such as naphthyl and hydrocarbon substituted fused-ring radicals. Of the aromatic radicals, it is preferred to employ aromatic radicals having up to about 10 carbon atoms. Radicals having a greater number of carbon atoms can be used though they are less desirable generally because they add additional weight to the battery. Thus, the number of carbon atoms contained within the hydrocarbon radical is inconsequential other than that the greater number increases the weight of the reactant and from which usually not enough corresponding benefit, with regard to energy release, is derived therefrom. Therefore, it is not generally desirable to employ compounds wherein the carbons contained within the hydrocarbon radical is in excess of 30. Compounds having not more than 10 carbons in the hydrocarbon radicals are preferred. Other substituents, nitrogen, sulfur, etc. can be present within the nucleus so as to form a heterocyclic compound. Generally, however, not more than about three such substituents should be present within the nucleus. Other elements can also be present within the nucleus provided they be substantially inert. Substituents can also be present in substituted positions, up to about 3 in number, and can even be greater in number provided that they be substantially inert in the reaction.

Illustrative of these types of organometallic compounds are dimethylmagnesium, diethylmagnesium, methylmagnesium chloride, ethylmagnesium iodide, dipropylmagnesium, dinaphthylmagnesium, dioctylmagnesium, butylberyllium iodide, diphenylberyllium, dimethylzinc, diethylzinc, dioctylzinc, dipropylcadmium, dimethylcadmium, dioctylcadmium, diethylmercury, trimethylborane, triethylborane, trimethylaluminum, triethylaluminum, methyldiethylaluminum, trinaphthylaluminum, tripropylaluminum, etc.; trimethylgallium, triphenylgallium, trimethylindium, triphenylthallium, etc. In addition to the normal alkyl derivatives branched chain isomers can be employed. Likewise, a mixture of two or more organometallic compounds can be employed. When the organo radicals are dissimilar, mixed compounds result.

In addition to the above compounds and as heretofore stated, organometallic hydrides, halides and halohydrides can also be employed. Compounds of this type include phenylmagnesium bromide, o-tolylmagnesium bromide, magnesium hydride, cyclohexylmagnesium chloride, phenylethynylmagnesium bromide, cyclohexylmagnesium hydride, beryllium hydride, beryllium chloride, dimethylboron hydride, dimethylboron fluoride, diphenylboron chloride, diborane, tetraborane, diborane monochloride, beryllium borohydride, phenylboron dibromide, aluminum chloride, aluminum hydride, dimethylaluminum hydride, dimethylgallium chloride, diphenylindium bromide, diphenylthallium bromide, magnesium aluminum hydride, zinc hydride, zinc borohydride, cadmium hydride, mercury hydride, indium aluminum hydride, etc.; compounds of any of the foregoing types such as dimethylboron chlorohydride, etc.; and mixed metal hydrides, examples of which have already been stated. Other inorganic substituents, or anions, can also be present within the compound to the extent of even excluding the hydrogen and halides, for example, pseudo halides, viz., cyanide, azide, amide, thiocyanate, cyanate, etc.; sulfite, nitrite, sulfates, nitrates, etc.

The electrolytes which can be employed are of a very wide variety. Generally all that is essential is that the material be conducting. Aqueous salt solutions, acids and bases can be employed. Of course, when employing aqueous solutions, the electrode material must be compatible therewith. Thus, the very active metals, lithium, sodium, etc., cannot be employed as anodes in this environment. Likewise, many of the highly preferred type of electrolytes, described hereinafter, cannot be employed in aqueous solution because they are incompatible therewith. Organic type electrolytes, i.e., organic solvents containing salts to make them conducting, can also be employed. Such organic electrolytes, for example, are sodium iodide in acetonitrile, potassium thiocyanate in dimethylene glycol dimethyl ether, sodium cyanide in diethyl ether, etc.

As stated, the preferred electrolyte is a bimetallic complex having the following formula:

$$MR_x \cdot yM''R_n$$

wherein M is an alkali or alkaline earth metal such as lithium, sodium, potassium, rubidium, beryllium, magnesium, calcium, etc., or a radical exhibiting metallic behavior such as one selected from a group consisting of "onium" cations, for example, tetraalkylammonium, and also including pyridinium and arsonium ions or the like; R is an inorganic substituent or organic radical; for example R can be an inorganic substituent such as a hydrogen; a halide, for example, bromide or fluoride; a pseudo halide such as cyanide, azide, amide, thiocyanate, cyanate, or a sulfite, nitrite, sulfate, nitrate, or the like, or any hydrocarbon radical, saturated or unsaturated, straight chain or branched chain, cyclic, acyclic, aromatic. R, for example, can be any hydrocarbon radical, viz., it can be a monovalent radical derived from an aliphatic hydrocarbon by removal of one hydrogen atom, as methyl, ethyl, isopropyl, etc., and including those derived from alkenes, alkynes, alkadienes, alkatrienes, etc.; for example, vinyl, ethylnyl, propenyl, isoprenyl, butadienyl, 1,4-pentadienyl, 3-ethynyl, etc.; or an aryl, for example, phenyl, naphthyl, etc.; an aralkyl, benzyl, styryl, diphenyl methyl, etc.; an alkaryl, tolyl, xylyl, cymyl, etc., and including the cyclic hydrocarbons such as 1,3-cyclopentadienyl, cyclohexenyl, cyclohexyl, etc. In addition substituents can be present within the radical provided that it be relatively inert. $x$ and $n$ are small integers equal to the valence of M and M'' respectively, and also representing the number of R substituents wherein the nature of the bonding is not truly ionic up to and including the number of substituents which would be represented if the nature of the bond were truly ionic; and $y$ is an integer not greater than two; M'' is a group II through group VIII metal; within the compound the R's can be the same or different, i.e., the R or R's attached to the $MR_x$ moiety can be the same or different from the R's attached to the $M''R_n$ or Lewis acid moiety, and the R's contained within the $M''R_n$ moiety can also be the same or different, i.e., the same or different from the R within the $MR_x$ moiety or from the other R's contained with the $M''R_n$ moiety; generally, however, the R, or R's, as originally associated with the $MR_x$ moiety or prior to any electrochemical reaction, is more electronegative than the R's as associated with the $M''R_n$ moiety.

More specifically however, at least in the preponderance of cases, the non-metallic portions of the molecule actually attached to the M'' or group II through group VIII metal and the alkali or alkaline earth metal exists as an independent ion. Thus, if M and M'' represent the two metals and R represents a multiple number of any non-metallic portions of these classes of compounds, the empirical formula for these electrolytes can preferably be written:

$$xM \cdot yM''R_n$$

wherein M, M'', R, $x$, $y$ and $n$ are as defined above.

Illustrative of the class of compounds included in the above general formula are such hydrides as lithium aluminum hydride, magnesium aluminum hydride, lithium borohydride, calcium borohydride, lithium magnesium hydride, sodium germanium hydride, sodium antimony hydride, potassium germanium hydride, etc.; the halides of these metals such as sodium magnesium fluoride, magnesium aluminum fluoride, sodium aluminum tetrachloride, sodium borofluoride, magnesium borofluoride, sodium lead chloride, lithium antimony chloride, sodium zirconium chloride, sodium tantalum chloride, lithium chromium bromide, lithium manganese chloride, lithium iron chloride, etc.; compounds of this class also include those containing both halogen and hydrogen, for example lithium magnesium chlorohydride, sodium zinc fluorohydride, magnesium boro chlorohydride, lithium boro chlorohydride, lithium aluminum chlorohydride, magnesium aluminum chlorohydride, lithium germanium chlorohydride, calcium germanium fluorohydride, lithium bismuth iodohydride, lithium vanadium chlorohydride, lithium chromium chlorohydride, lithium manganese chlorohydride, lithium palladium chlorohydride, etc.; and also hydrides, halides and halohydrides containing organic radicals such as lithium methylmagnesium hydride, lithium triethylaluminum hydride, lithium triethylborohydride, lithium triphenyltitanium chloride, lithium tris(cyclopentadienyl)-vanadium chloride, lithium phenylchromium chloride, lithium phenylmanganese chloride, lithium phenylcobalt chloride, etc.; lithium methylaluminum chlorohydride, lithium decyl boro fluorohydride, lithium phenyltitanium tetrachloride, sodium bis(cyclopentadienyl)chromium dichloride, sodium bis(cyclopentadienyl)manganese fluoride, etc. Compounds of this type also include, for example, lithium triethylmagnesium, magnesium tetraethyl boron, lithium tetraethylborane, lithium tetraphenylaluminum, lithium pentaethyltin, lithium tetraphenylantimony, sodium tris(cyclopentadienyl)titanium dibromide, sodium tris(cyclopentadienyl)chromium, sodium tris(cyclopentadienyl) manganese, lithium tris(cyclopentadienyl)cobalt, etc.; other compounds include those having other inorganic substituents including such inorganic anions as nitrate, nitrite, sulfate, sulfite, the pseudo halides, etc.; such compounds, for example, include potassium triethyl borocyanide, potassium triethylaluminum isocyanate, potassium triethyl boro thiocyanate, sodium triethylaluminum sulfate, sodium triphenylaluminum nitrite, etc. Included also are those compounds having only inorganic anion substituents other than hydrogen and containing no hydrocarbon radicals, viz., sodium aluminum chloride, barium chloride complexed with aluminum chloride, sodium chloride complexed with magnesium chloride, etc. Generally, the preferred compounds of this class are the organometallic complexes or organometallic electrolytes. Those classes of compounds mentioned above which include hydrogen, viz., hydrides, are also highly preferred whether or not an organic radical is contained within the compound.

Illustrative of this preferred class of compounds are sodium diphenyl cyclopentadienylmagnesium, sodium diphenyl cyclopentadienyl zinc, sodium triethyl cyclopentadienyl aluminum, sodium diethyl cyclopentadienylaluminum chloride, sodium ethyl cyclopentadienylboron chlorohydride, lithium tetraethyl phenyltin, lithium tetraphenyl tin chloride, lithium diphenyl methyl tin chlorohydride, potassium ethyl t-butyl silicon trichloride, potassium diethyl titanium chlorohydride, potassium tetraethyl vanadium, potassium triphenyl ethyl arsine, potassium phenyl ethyl arsine chloride, sodium methyl hydroselenide, sodium fluoride bis(cyclopentadienyl)manganese, sodium fluoride cyclopentadienyl manganese bromide, sodium ethyl manganese difluoride, etc.

As stated, the above complexes, viz., the preferred organometalic electrolytes of this invention, are generally formed by reacting a salt-like compound of an alkali or alkaline earth metal with an organometallic compound. It will be understood that the two compounds need not be present in any definite stoichiometric relationship other than as is necessary to make the organometallic compound, or its equivalent as defined, electrically conducting. Generally, however, any excess of either compound does not prevent some degree of formation of the complex and an electrolyte so formed can nevertheless be considered a solution of the complex in question.

In the environment wherein an excess of the $M''R_n$ moiety of the electrolyte is present, and the species is similar to the acceptor, $M'R_n$, it will be understood that this excess can act as an acceptor for the oxidizer. In other words, the compounds defined as the acceptor, $M'R_n$, falls within the range of compounds defined by the $M''R_n$ moiety of the bimetalic complex and when $M''R_n$ is the equivalent of the acceptor, $M'R_n$, an excess of the $M''R_n$ moiety of the electrolyte will serve as the acceptor. This does not mean, however, that the acceptor, $M'R_n$, need be the identical species of the $M''R_n$ moiety of the electrolyte. The organometallic compound per se, or as represented by the $M''R_n$ moiety, comprises metals and metalloids selected from groups II through VIII of the periodic chart of the elements, but preferably comprises metals of group III, especially boron which falls within group IIIA. Organoboron and organoaluminum compounds are especially preferred because of their highly energetic character. In this preferred compound, it is essential that the metal, or metalloid, be bonded or attached directly to one or more carbon atoms. However, it is to be understood that the metal or the preferred compounds in addition to having at least one metal to carbon bond can also be bonded to inorganic substituents, viz., hydrogen, cyanide, sulfate, nitrite, etc., or for example, a halogen, e.g., chlorine, bromine, iodine and fluorine. These substituents include a wide variety of monovalent and divalent members. Generally the monovalent members are preferred. The compound can include a hydrogen or a halogen, or a mixture of hydrogen and halogen, or a mixture of any of the foregoing. The organic portion can be any organic radical including those having substituents in the radical, such as a halogen, provided such are essentially inert. In a preferred embodiment the organic radicals are hydrocarbon radicals, either acyclic or cyclic, saturated or unsaturated, aliphatic or aromatic radicals. Of the aliphatic radicals, it is preferred to employ the lower alkyl radicals having up to about 10 carbon atoms. Among the aromatic radicals which can be employed are included phenyl and hydrocarbon substituted phenyl radicals such as alkaryl radicals, and fused-ring aromatic radicals such as naphthyl and hydrocarbon substituted fused-ring radicals. Of the aromatic radicals, it is also preferred to employ radicals having up to about 10 carbon atoms. It will be understood that hydrocarbon radicals of greater molecular weight can be employed though they tend to decrease the energy output per unit weight of the electrolyte and are therefore generally undesirable. Hydrocarbon radicals having up to about 30 carbon atoms can give beneficial results. Also, heterocyclic radicals having up to about 3 non-carbon atoms—viz., nitrogen, sulfur, etc.—within the nucleus can be employed satisfactorily. The radicals can also contain up to about 6 substituted substituents—viz., halogen, nitro, etc.—without substantially reducing the beneficial results produced by the compound.

Illustrative of these types of organometallic compounds comprising the $M''R_n$ moiety are dimethylmagnesium, diethylmagnesium, methylmagnesium chloride, ethylmagnesium iodide, dipropylmagnesium, diphenylberyllium, dinaphthylmagnesium, butylberyllium iodide, diisopropylcalcium, dioctylmagnesium, dimethylzinc, diethylzinc, dioctylzinc, dipropylcadmium, dimethylcadmium, dioctylcadmium, trimethylboron, triethylboron, trimethylaluminum, triethylaluminum, methyldiethylaluminum, trinaphthylaluminum, tripropylaluminum, tris(cyclopentadienyl)-ytterbium, tris(cyclopentadienyl)scandium, cyclopentadienyltitanium trichloride, dicyclopentadienyltitanium dibromide, bis(cyclopentadienyl)vanadium, dibenzene-chromium, benzene chromium tricarbonyl, cyclopentadienylchromium, dichloride, dicyclopentadienylchromium bromide, phenylmanganese pentacarbonyl, cyclopentadienylmanganese iodide, bis(cyclopentadienyl)manganese, bis(indenyl)cobalt, bis(cyclopentadienyl)cobalt, cyclopentadienylnickel nitrosyl, bis(cyclopentadienyl)nickel, tris(cyclopentadienyl)lanthanum, tris(cyclopentadienyl)-cerium, bis(cyclopentadienyl)praseodymium halide, bis-(cyclopentadienyl)neodymium halide, bis(cyclopentadienyl)samarium halide, bis(cyclopentadienyl)gadolinium halide, bis(cyclopentadienyl)dysprosium halide, bis(cyclopentadienyl)erbium halide, bis(cyclopentadienyl)ytterbium halide, benzene tungsten tricarbonyl, bis(cyclopentadienyl)rhenium hydride, bis(cyclopentadienyl)iridium bromide, bis(cyclopentadienyl)iridium chloride, trimethylplatinum iodide, trimethylplatinum hydroxide, bis(cyclopentadienyl)thorium bromide, etc.

In addition to the normal alkyl derivatives indicated heretofore, branched chain isomers can be employed. Likewise, a mixture of two or more organometallic compounds can be employed. When the organo radicals are dissimilar, mixed compounds result.

In addition to the above compounds and as heretofore stated, organometallic hydrides, halides, and halohydrides can also be employed. Compounds of this type include phenylmagnesium bromide, o-tolylmagnesium bromide, cyclohexylmagnesium chloride, cyclohexylmagnesium hydride, dimethylboron hydride, methylboron difluoride, methyltin trichloride, triethyltin chloride, triethyllead fluoride, ethyltrichlorosilane, methyl arsenic dihydride, triphenyl arsine, diphenyl arsine hydride, methyl tellurium chloride, methyl tellurium hydride, triphenyl chromium bromide, cyclopentadienylmanganese chloride, cyclopentadienyl nickel chloride, cyclopentadienylcobalt bromide, etc.; mixed halogen hydride compounds of any of the foregoing types such as methyl boron chlorohydride, ethyl dichlorosilicon hydride, diphenyl chloro arsine, $\beta$-chlorovinyl dichloro arsine, etc.; and mixed metal hydrides. As stated, other inorganic substituents, or anions, can also be present within the compound.

The alkali metal salt-like compounds preferably employed are those which directly form complexes with the organometallic compounds above described. The complex is generally prepared by heating a mixture of any of the organometallic compounds of the type above described with the salt, defined hereinafter, and then cooling the product. It will be, as stated heretofore, that many of the complexes can be prepared by indirect methods. Many of the complexes so formed are liquid at room temperature. Many of the products obtained are in a high state of purity and require no purification. The complexes can thus be prepared in situ within the cell.

Specific examples of such salts include alkali and alkaline earth metal fluorides, i.e., lithium fluoride, potassium fluoride, sodium fluoride, magnesium fluoride, calcium fluoride, beryllium fluoride, and the like. Alkali and alkaline earth metal halides, i.e., bromides, iodides, chlorides are also suitable as are the metal hydrides, such as the simple hydrides themselves or certain alkyl metal hydrides. Sulfates, nitrates, thiosulfates, and those salts formed with the pseudo halides, viz., cyanide, cyanate, thiocyanate, amide, azide, etc., can also be employed. Examples of these compounds are sodium cyanide, potassium nitrate, potassium nitrite, lithium sulfate, sodium sulfite, sodamide, calcium cyanide, magnesium azide, etc. In addition, any hydrocarbon radical, viz., ethyl, methyl, propyl, isobutyl, hexyl, decyl, phenyl, benzyl, vinyl, alkynyl, etc., can also be employed. For example, such compounds include ethylsodium, ethylpotassium, phenylsodium, phenylpotassium, cyclopentadienyl sodium, sodium acetylide, phenyllithium, tolylsodium, tolyllithium, naphthylsodium, naphthylpotassium, naphthyllithium, dinaphthylmagnesium, and the like. In addition, certain organic radicals are known to exert the same behavior as alkali metals and can even be used to substitute for the metal, viz., the tetraalkylammonium ion, pyridinium ion, arsonium ion, etc. Thus, these can be substituted for the MR moiety or salt. It will also be understood that while such salts as tetraethylammonium ethyl $(C_2H_5)_4NC_2H_5$ do not normally exist, the corresponding complexes may nevertheless be prepared by double decomposition. This can be done, for example, by using the sodium complex and an "onium" halide, viz., tetraethylammonium chloride $(C_2H_5)_4NCl$+sodium metal tetraalkyl, $NaMR_4 \rightarrow$ tetraethylammonium metal tetraalkyl $(C_2H_5)_4NMR_4$+sodium chloride, $NaCl$.

Many of the complexes of the foregoing type are liquid at ordinary temperautres, and others are liquid at only slightly higher than normal temperatures. When the electrolyte has a sufficiently low melting point at ordinary temperatures, it is generally preferable that it be employed within the cell in its normal state, i.e., without a solvent. In other instances where the selected electrolyte is normally solid at the temperature at which the cell is to be operated, it can be dissolved in a solvent. The solvent can be organic or even aqueous in some cases, but the former is generally preferred. Preferred solvents, concentrations and other operating conditions are defined as follows.

Thus, many of the electrolytes, particularly the organometallic electrolytes employed may be liquid at operating temperatures in which case no solvent is necessary. If the electrolytes or organometallic electrolytes, however, normally exist as a solid or semi-solid at operating conditions, then it is usually desirable to employ the solvent. The principal requirement for the solvent is that it dissolve the compound or form a solvate with it which often has improved conductivity properties over the compound itself. The use of a solvent, however, is not essential to the operation of the battery and its absence may be desirable in some instances. When a solvent is employed, it is not necessary that the products formed during the operation of a battery be soluble in the solvent, though with most solvents this is the case. When this occurs, it is highly desirable to provide the anode and cathode in separate compartments within the battery.

In general, solvents suitable for the organometallic electrolytes are ethers and polyethers (including cyclic ethers), amines, nitriles, other organometallics, amides and substituted amides, and hydrocarbons including cyclic, alicyclic, and aromatic. The ethers and aromatics are generally preferred. Water can also be employed in some instances. Typical examples of suitable solvents are ethers, such as dimethyl ether, diethyl ether, methylethyl ether, methylisopropyl ether, methyl-n-propyl ether, and mixtures thereof. Suitable polyethers are ethylene glycol diethers, such as dimethyl, methylethyl, diethyl, methylbutyl, ethylbutyl, dibutyl, and butyllauryl; trimethylene glycol ethers such as dimethyl, diethyl, methylethyl, etc.; glycerol ethers such as trimethyl, dimethylethyl, diethylmethyl, etc.; and cyclic ethers such as dioxane and tetrahydrofuran. Typical amines suitable for this invention include aliphatic and aromatic amines and heterocyclic nitrogen compounds. The preferred tertiary amines for use in this invention are trimethylamine, dimethylethylamine, tetraethylethylenediamine and N-methylmorpholine. Primary and secondary amines can also be used such as methylamine, dimethylamine, acetonitrile, etc. Alcohols can also be employed as solvents, vix., ethyl, methyl, isopropyl, etc. Other suitable solvents include such aromatics as toluene, xylene, etc.; cyclic compounds such as cyclohexane, etc.

The concentration of the organometallic compound or other electrolyte within the electrolyte solution, when a solvent is employed, is not critical. In a preferred operation, however, the concentration of the compound is maintained generally near saturation within the solvent.

In preferred embodiments "dry cells" are formed by absorbing the electrolyte or electrolyte solution within absorbent materials, for example, asbestos, fiber glass, nylon, etc. Gel forming agents can also be use for this purpose, for example, plastic, dry finely ground silica gel or any one of a wide variety of inert powdered materials. The primary requirement is that they be essentially inert.

In any battery the reactants must be kept apart until used. This can be accomplished, for example, in the battery employing a lead electrode by building up a solid phase of an oxide, sulfide, etc., thereon. Electrons can move but the oxygen, sulfide, etc., cannot. In cells using a gas, for example, oxygen or chlorine, the gas would be separated from the liquid and stored separately until discharge.

A double liquid phase electrolyte can also be used if a two compartmental cell be employed. Also two phases can be separated by a membrane of the ion exchange resin type which passes only cations. Examples of such resins presently on the market include Amberplex C–1, a sulfonated polystyrene resin comminuted and held in a matrix of an inert polymer; and Nepton CR–61, a homogenous sheet of sulfonated phenol formaldehyde polymer. The materials separating the electrodes can also be solids, for example, fiber glass. Materials similar to semiconductors can also be used with reducing metal electrodes. For example, one electrode can be made of aluminum, while a layer of antimony sulfide forms the other electrode. Any method of storing electrons or free radicals in a solid lattice can be converted to supplying electrical energy.

It is also sometimes desirable to employ conventional type diaphragms separating the anode and cathode of the battery. Use of such diaphragms is normally determinable by the nature of the products formed during operation of the battery. Thus, if the products are not very soluble in the electrolyte diaphragms are not usually necessary. On the other hand, if the products are extremely soluble in the electrolyte, it is usually desirable to employ a diaphragm or to separate the anode and cathode compartments by other means, as described.

A wide variety of electrode materials are suitable for the practice of this invention. Thus, any of the metals from the Table of Electromotive Force Series can be selected in conformity with well known scientific principles.

It is preferable to choose a metal as one of the reactants in the cell because electrical contact is easily made therewith. Alkali or alkaline earth metals such as sodium are very active electrochemically, are cheap and have a high reduction potential. Accordingly, the preferred anode material includes the groups IA, IIA and IIB metals, particularly the more active metals from these groups, viz., lithium, sodium potassium, etc.; beryllium, magnesium, zinc, cadmium, etc. The anode materials also include the rare earth metals cerium, praseodymium, neodymium, etc., and the group IIIA metals, aluminum, etc. Mixtures of any of the foregoing metals can also be employed. Amalgams of these metals also prove very useful. It will be understood, of course, that the alkali and most of the alkaline earth metals cannot be employed in contact with aqueous solutions. In these instances, if a solvent be desirable, one of the many organic solvents described hereinafter can be employed. Of course, the refractory metals, for example, are stable toward water and aqueous solutions can be employed in contact therewith if desirable.

The only requirements for the cathode is that the material selected be conductive, chemically nonreactive with the materials employed within the battery or cell, and that it provide sufficient structural strength. Carbon or graphite alone, or blended with various metals, provides an excellent cathode material. Any of the various metals presently employed as cathodes are also very useful—viz., steel, iron, nickel, lead, copper, etc.—those materials providing a porous surface are preferred, for example, sintered nickel, etc. Electrically conductive plastics can also be employed. Of course, in the present invention a cathodic oxidizing system is supplied to the catholyte in contact with the cathode. These materials are supplied as liquids, solids or even gases.

One difficulty encountered when we leave the realm of metals for cathodic materials is the problems of providing good electrical contact. This is especially true of the gases. Accordingly, a preferred method of providing good electrical contact is to absorb the gas in the vicinity of the cathode of the battery in the form of a loose chemical complex. In this form, it keeps most of its oxidizing power, and being in a condensed phase, it has better contact with the electrode. Another preferred method is to allow the gas and liquid to contact each other at the electrode surface. This permits direct reaction of the gas. For example, where a gas is employed as the cathode, the gas can be passed or bubbled over a plate of platinum which is covered with platinum black. The gas is adsorbed, i.e., condensed and held upon the surface; and in this condition, the gas is conducting in the same manner as a metal electrode. The gas can also be introduced into the solution through a porous inert material, such as carbon or graphite.

The temperature at which the battery operates is not critical and, as stated heretofore, has operability over a wide range. For example, electrolytes can be provided which can operate at sub-zero temperatures, temperatures above which existing electrolytes freeze or the components separate. Thus, these batteries will find use in the arctic climate. On the other hand, the high temperatures possible, up to at least about 300° C. will make possible many specialized purposes and will find use in missile applications. This flexibility in temperature range can also eliminate the problem of short "shelf life" so acute in standard batteries. Thus, the batteries can be maintained at a temperature wherein the electrolyte is solid and when needed can be rapidly heated to operating temperature. In general applications the temperature should be sufficiently high to maintain the electrolyte as a liquid but should not be appreciably above the decomposition temperature of the organometallic electrolyte or solvent, where one be employed. Thus, the operating temperature of the battery depends upon the particular organometallic compound involved and this will be often "tailored" to its unique purpose. In general, suitable temperatures for normal uses are between about −120° C. and about 300° C., but temperatures from about −50° C. to about 120° C. are generally preferred.

Normally the batteries will be operated at atmospheric pressure, though occasionally it may be desirable to operate a pressure cell to contain a gaseous reactant. While subatmospheric pressures are permissible for some applications, the affinity of the organometallic electrolytes for moisture and, in some cases, oxygen, usually makes this operation somewhat hazardous and impractical. In some instances, supra-atmospheric pressure may be desirable, particularly when employing a relatively high temperature and a relatively volatile solvent or an electrolyte containing a relatively unstable salt. Also, a pressure of inert gas may sometimes be desirable, for example, to assume anhydrous conditions. When gas is employed, the pressure range is preferably from atmospheric to about 20 atmospheres.

The voltage produced and the current generated by the battery depends upon the nature of the cathodic oxidizing system, the electrodes employed, and upon the nature of the electrolytes. It also depends upon the specific resistance of the battery itself. These requisites also primarily determine the use to which the battery will generally be employed, viz., a high energy or high power use. In general, the potential across the electrodes is higher than in conventional batteries. Even higher voltages can, of course, be generated by arranging the cells in series.

Having described the invention, what is claimed is:

I claim:

1. In a voltaic cell including at least an anode and cathode immersed within an electrolyte as defined hereinafter, the improvement comprising providing an acceptor and an oxidizer at the cathode, said acceptor being a compound having the formula:

$$M'R_n$$

wherein M′ is a metal selected from groups IIB and IIIB and berylium and magnesium of group IIA; R is selected from the group consisting of hydrogen, halogens, pseudo-halogens and hydrocarbon radicals; $n$ is an integer equal to the valence of M′; and the oxidizer is a compound selected from the group consisting of metal halides, non-metal halides, metal oxyhalides and non-metal oxyhalides, organic esters of inorganic acids, halogenated aromatic esters and organic halides; the metal of said metal halides being selected from the groups consisting of group IV, V, VIB, VIIB and VIII metals and metalloids; a moiety of said non-metal halides consisting of an element selected from groups IVA, VA and VIA; the metals of the said metal oxyhalides being selected from the group consisting of groups IV, V and VI; and a moiety of the said non-metal oxyhalides being selected from the group consisting of groups IVA, VA and VIA; and the electrolyte is a bimetallic complex having the empirical formula:

$$MR_x \cdot yM''R_n$$

wherein M is a metal selected from the group consisting of IA and IIA metals, and onium cations; M″ is a metal selected from groups II through group VIII of the periodic chart of the elements; R is selected from the group consisting of hydrogen, halogens, pseudo-halogens, and hydrocarbon radicals and wherein at least one of the R members is a hydrocarbon radical; $x$ and $n$ are integers equal to the valence of M and M″, respectively; and $y$ is an integer not greater than 2.

2. In a voltaic cell including at least an alkali metal anode and a cathode immersed within an electrolyte as defined hereinafter, the improvement comprising providing an acceptor and an oxidizer at the cathode, said acceptor being a compound having the formula:

$$M'R_n$$

wherein M′ is a group IIIB element selected from the group consisting of boron and aluminum metals; R is selected from the group consisting of hydrogen, halogens, pseudo-halogens and hydrocarbon radicals; $n$ is an integer equal to the valence of M′; and the oxidizer is a compound selected from the group consisting of metal halides; non-metal halides, metal oxyhalides and non-metal oxyhalides, organic esters of inorganic acids, halogenated aromatic esters and organic halides; the metal of said metal halides being selected from the groups consisting of group IV, V, VIB, VIIB and VIII metals and metalloids; a moiety of said non-metal halides consisting of an element selected from groups IV–A, VA and VIA; the metals of the said metal oxyhalides being selected from the group consisting of groups IV, V and VI; and a moiety of the said non-metal oxyhalides being selected from the group consisting of groups IVA, VA and VIA; and the electrolyte is a bimetallic complex having the empirical formula:

$$MR_x \cdot yM''R_n$$

wherein M is a metal selected from the group consisting of IA and IIA metals, and onium cations; M″ is a metal selected from groups II through group VIII of the periodic chart of the elements; R is selected from the group consisting of hydrogen, halogens, pseudo-halogens, and hydrocarbon radicals and wherein at least one of the R members is a hydrocarbon radical; $x$ and $n$ are integers equal to the valence of M and M'', respectively; and $y$ is an integer not greater than 2.

3. The apparatus of claim 2 wherein the acceptor is triethylborane.

4. The apparatus of claim 2 wherein the acceptor is triethyl aluminum.

5. The apparatus of claim 2 whrerein the anode is sodium metal.

6. The apparatus of claim 2 wherein the anode is potassium metal.

References Cited in the file of this patent

UNITED STATES PATENTS

| 2,696,513 | Lehovec | Dec. 7, 1954 |
| 2,786,088 | Robinson | Mar. 19, 1957 |
| 2,897,249 | Glicksman et al. | July 28, 1959 |

FOREIGN PATENTS

| 320,526 | Great Britain | Oct. 17, 1929 |
| 376,238 | Great Britain | Dec. 31, 1930 |